United States Patent [19]

Wong

[11] 4,384,543
[45] May 24, 1983

[54] COMBINED UNDERINFLATION INDICATOR AND RELIEF VALVE

[76] Inventor: Jacob Y. Wong, 4589 Camino Molinero, Santa Barbara, Calif. 93110

[21] Appl. No.: 258,581

[22] Filed: Apr. 29, 1981

[51] Int. Cl.³ .............................................. B60C 23/04
[52] U.S. Cl. .............................. 116/34 R; 73/146.8; 137/227; 137/230
[58] Field of Search ..................... 116/34 R; 73/146.8; 137/227, 230, 229

[56] References Cited

U.S. PATENT DOCUMENTS

| | | | |
|---|---|---|---|
| 1,644,193 | 10/1927 | Kennedy et al. | 116/34 R |
| 3,738,308 | 6/1973 | Barabino | 116/34 R |
| 3,799,037 | 3/1974 | Schmidt | 73/146.8 X |
| 4,024,829 | 5/1977 | Su | 137/227 X |
| 4,174,673 | 11/1979 | Tung et al. | 116/34 R |
| 4,208,982 | 6/1980 | Byram | 116/34 R |
| 4,235,185 | 11/1980 | Byram | 73/146.8 |

Primary Examiner—Daniel M. Yasich
Attorney, Agent, or Firm—Harry W. Brelsford

[57] ABSTRACT

This invention provides a screw-on device for valve stems of automobile tires which will indicate to an automobile operator when a particular tire is under the selected standard psi. The indicator is a visible device that projects towards the outer end of the tubular member of the invention where it can be observed. The automobile operator thereupon adds air to the tire by the usual service station compressed air device and no tire guage is necessary to determine the right pressure. If insufficient pressure has been inserted in the tire the indicator will show up again, when the operator ceases adding air; if too much air has been added the device acts to relieve the excess pressure and the device will automatically close off relief flow when the standard pressure has been achieved. The pressure responsive mechanism is pre-calibrated to a particular pressure, for example 24 psi, 28 psi, 32 psi, etc.

1 Claim, 4 Drawing Figures

COMBINED UNDERINFLATION INDICATOR AND RELIEF VALVE

This invention relates to the inflation of pneumatic tires used on automobiles and other vehicles and has particular reference to a device for the inflating stems of such tires. The combined structure acts as a relief valve for excess pressure at the time of adding air to a tire, but automatically compensates for an increase in pressure due to an increase in temperature of the air in the tire, and also acts to provide a visual indicator for under inflation.

BACKGROUND OF THE INVENTION

There has long been a need for underinflation indicators and many devices have been sold and others patented to meet this need. While this under inflation is an obvious need, there exists a less obvious need to avoid over inflation. Too high a pressure in a tire not only results in a hard and uncomfortable ride, but also poses safety considerations of blow-outs.

In this present age of energy shortage, particularly in petroleum-based energy sources, the automobiles have been one of the largest users of this form of energy, namely, through the use of gasoline. Efforts are now underway in a variety of areas to improve the mileage of automobiles in order to save gasoline. It has been widely accepted that for an ordinary car, improperly inflated tires can lead to a decrease in mileage per gallon of gasoline. In most instances the direct cause is that an improperly inflated (i.e. not enough pressure) tire leads to more contact area of the tire with the road surface and hence increases friction. Radial tires present a particular problem in that they bulge and seem underinflated at proper tire pressures and they seldom seem to bulge more at low tire pressures.

For most mechanically oriented persons the checking of the tires with a tire gauge once a week or less is a routine and easy matter. Other less mechanically inclined individuals have to rely regularly on other people checking the tire pressures for them. This is normally done at the service stations while these people are buying gasoline. However the proliferation of self-service stations in order to compensate for the sky-rocketing price of gasoline has just about eliminated this regular tire pressure checking service for most gasoline buyers. The end result is that a growing number of people these days are driving with improperly inflated tires most of the time, due to the lack of tire checking service. A simple device is needed at least to alert these people that the tires on their automobiles need pressure. Once they know they can take action to correct the situation.

Although devices exist today for telling people the pressure of their tires the complexity of using them remains a problem for the mechanically less-inclined general public. One of the recent devices, other than the standard tire pressure gauge, is a miniaturized pressure gauge built into a screw-on device tire pressure stem. This device can be screwed into the tire pressure inlet stem and the pressure can then be read off from the miniaturized gauge. While this device eliminates the need to know how to use a standard gauge to read the tire pressure it is still not simple enough in that one still has to learn how to use and read this miniaturized gauge. In view of the size of the gauge it is difficult to read and the accuracy can also be questioned. A more simple and quicker way of checking the tire pressures is clearly desirable at the present time.

BRIEF SUMMARY OF THE INVENTION

The present invention provides a simple tire pressure indicator/regulator, one of whose functions is to alert people that one or more of the tires in their automobiles need more air. Each device can simply be screwed onto the tire pressure inlet stem in place of a cap. The device comes with preset tire pressure values such as 26 psi or 28 psi (cold value) which is selectable by the user to suit his need. Once the device is screwed into position one of three situations can prevail. First, if the pressure of the tire is above the preset value (e.g., 28 psi) then the device will automatically regulate (i.e., bleeds air out) the tire pressure to the preset value. Under this condition no "red ball" is observable on the air inlet area of the device. Second, if the tire pressure is exactly the same (to within specification tolerance) as the preset value of the device then nothing occurs and again no "red ball" is observable on the air inlet area of the device. Third, if the tire pressure is less than the preset value of the device, i.e., the tire needs more air, the "red ball" will appear on the air inlet area of the device alerting the user that air is needed in that particular tire. To inflate the tire back to the preselected value one does not have to remove the device from the tire. By depressing the "red ball" via a standard high pressure air source one can put pressure directly into the tire. As indicated previously, the device automatically regulates the tire pressure to the preset value of the device so that one simply inflates the tire and checks for the disappearance of the "red ball" from the air inlet area. Thus, the device can stay permanently on the pressure inlet stem of the tire, or the stem in the wheel for tubeless tires.

The design of the device automatically compensates for the increase in pressure of the tire when the car is being driven on the road. This self-compensating feature of the device guarantees the accuracy of the preset tire pressure that one desires when the tire is cold.

DETAILED DESCRIPTION

Various objects, advantages and features of the invention will be apparent in the following description and claims considered together with the drawings forming an integral part of this specification and in which:

Figure 1:
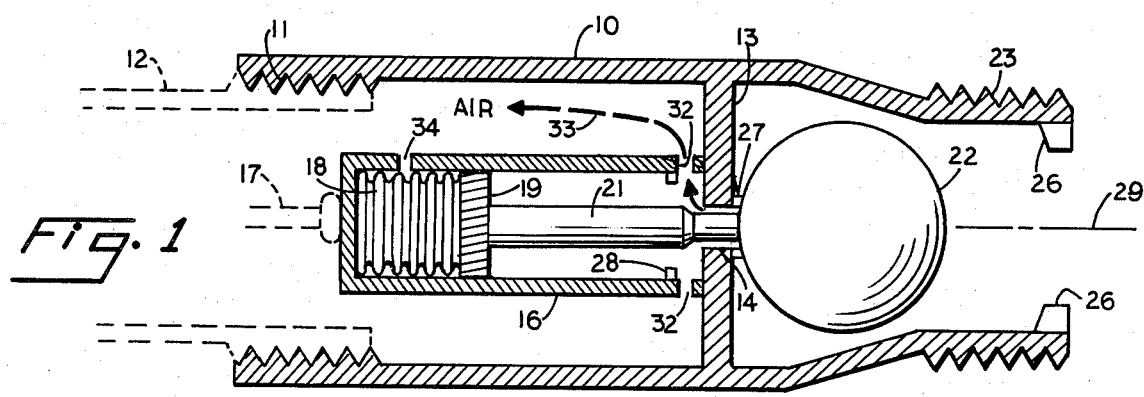
FIG. 1 is a section of view through a presently preferred embodiment of the device showing the relationship of parts when air under pressure is flowing through the device to an automobile tire.

Referring to the drawings the combined indicator and release valve has a tubular casing or member 10 which is internally threaded at 11 to be threaded upon the usual tire stem 12 shown in the broken outline. For tubeless tires the stem is usually mounted directly on the wheel and for tube tires the stem is connected to the inner tube. The tubular member 10 is provided with a transverse partition 13 which is apertured at 14 to allow ingress and egress of air. Secured to the left side of the partition 13, the side toward the tire stem 12, is a housing 16 for the pressure responsive device. This housing 16 has a length such that it contacts the usual valve pin 17 in the tire stem 12 depressing it so that air flows freely in the tire stem 12.

Disposed in the pressure responsive housing 16 is a pressure responsive device shown in the form of a bellows 18 having one end secured to the housing 16 and having the other end secured to a piston-like member 19 to which is secured a valve stem 21. The valve stem 21 is disposed in the aperture 14 in the partition 13 and preferably has an enlarged indicator ball 22 on the right end as viewed in the drawings.

The righthand end of the tubular member at 10 is reduced in diameter and externally threaded at 23 so that it can receive a transparent cap 24 of the standard size used on the capping tire stems. Disposed on the extreme right end of the tubular member 10 are a plurality of internally projecting lugs 26 which limit any outward movement of the ball 22. The inward movement of the ball 22 is limited by a plurality of lugs 27 surrounding the partition aperture 14 so that air can pass through the aperture even when the ball is in its withdrawn position shown in FIG. 1. The housing 16 is provided with internally projecting lugs 28 to limit the outward movement of the piston 19.

The valve stem 21 is provided particularly in accordance with the invention and it reciprocates parallel to a tubular axis 29 shown in FIG. 1. The valve stem 21 has a reduced section 31 adjacent to the ball 22, and as illustrated in FIG. 1, air can pass through the aperture 14 when in the position of FIG. 1. However when the valve stem 21 is in the position shown in FIGS. 2 and 3 then flow through the aperture 14 is cut off.

OPERATION

The relationship of the parts is shown in FIG. 1 when air under pressure is being introduced into the tubular member 10 and to the tire stem 12 to which it is attached. This air from the usual air filling device at service stations is considerably higher in pressure than the air carried in the tires of the automobile and accordingly air flows around the lugs 27, through the aperture 14 in the partition 13 and through a plurality of holes 32 in the pressure responsive housing 16. These holes 32 are restricted in total flow area so that a pressure builds up in the housing 16 which is greater than the pressure in the tire of the automobile forcing the piston 19 to the left as shown in FIG. 1. This flow of air is shown by the arrow 33. If the operator ceases adding air and if too much air has been added to the tire then this pressure will exert itself upon the bellows 18 by passing through the holes 34 in the pressure responsive housing 16. The bellows 18 will retain the compressed condition shown in FIG. 1 when too much air has been introduced and this excess air then flows in the reverse direction from the arrow 33 through the holes 32 and through the aperture 14 to atmosphere at the righthand end of the tubular member 10. In this fashion the device acts as a relief valve for excess pressure. This relief valve action makes it unnecessary for the operator to use a tire gauge to obtain the correct inflation pressure, as the excess automatically bleeds off until the design standard pressure prevails.

Figure 2:
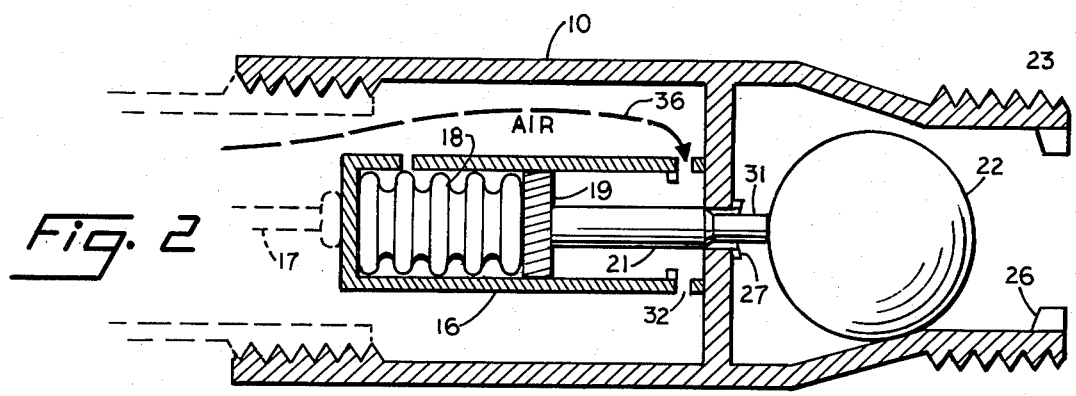
FIG. 2 is a view of the device of FIG. 1 when the preselected pressure prevails in the tire.
Figure 3:
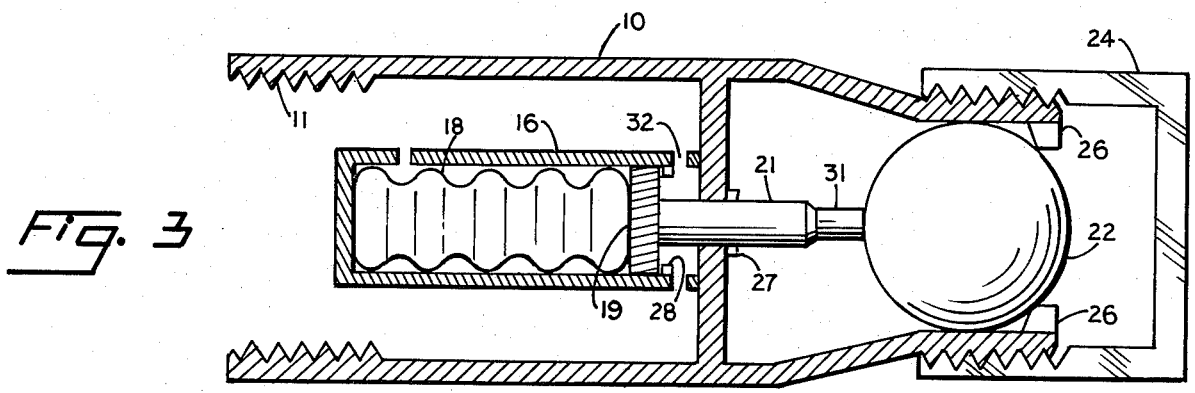
FIG. 3 is a view of the device of FIG. 1 when the tire pressure is less than the preselected pressure and the ball indicator is visible at the outer end of the device.

If, however, there is insufficient air pressure in the tire after filling, or any other time, the elastic bellows 18 will expand as shown in FIG. 3 and the ball 22 will be forced against the lugs 26 where it will be clearly visible through the cap 24. For this purpose the ball 22 is preferably red (or white or yellow) or some other highly visible color so that it can be readily perceived. The person then adding air realizes that insufficient air has been inserted in the tire and then continues the insertion of air as described with respect to FIG. 1. When the desired amount of air is present or if too much air has been added and enough escapes to reduce the tire pressure to that desired, then this condition is shown in FIG. 2 wherein the large portion of the valve stem 21 engages the aperture 14 tightly so that no air escapes. The red ball 22 will no longer be visible to the operator who then knows that the proper pressure prevails.

The pressure responsive device is the bellows 18 shown in FIGS. 1 through 3 and these bellows can be of any suitable construction such as metal or flexible plastic. If formed of plastic it is desirable, depending upon the elasticity of the plastic bellows, to insert a metal spring inside of the bellows. In any event, the bellows 18 are sealed to atmosphere and this causes them to be temperature sensitive. If, for example, an automobile is driven on a hot day or in a hot area such as a desert, the tire pressure will increase in the tire. It is desirable however that this pressure not be relieved so that the tire maintains its full pressure regardless of tire temperature. The hot air inside of the tire will heat up the pressure responsive housing 16 and heat up the bellows 18 causing it to tend to expand and thereby counteract the air pressure inside the tire indicated by the arrow 36 in FIG. 2. In this fashion the bellows 18 acts as a temperature sensing actuator for a relief valve, so that air will not be released as pressure builds up in the tire due to heat of the tire itself, and consequently heat of the air inside of the tire. It should be noted that the valve stem 21 serves the dual function of a valve (with aperture 14) and an indicator for underinflation. The use of a ball at the outer end of the valve stem 21 makes for maximum visibility, compared to the bare ends of stem 21.

Figure 4:
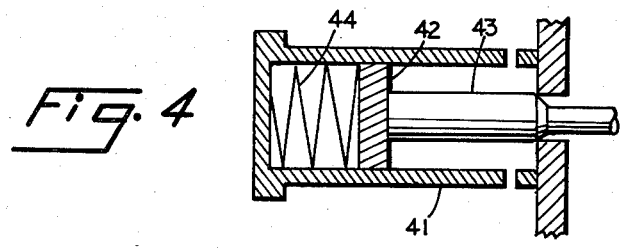
FIG. 4 is a fragmentary sectional view through a modified pressure responsive mechanism.

Shown in FIG. 4, is a modified form of pressure responsive device wherein a housing 41 has an air tight piston 42 secured to a valve stem 43. Disposed between the left hand part of the housing 41 and the piston 42, is a spring 44 formed of a metal that becomes stronger as the heat increases. In this fashion, increase in tire pressure due to temperature will heat up the spring, 44, causing it to resist the tendency of the valve stem 43 to move to the left and open the valve.

My combined underinflation indicator and relief valve is preferably pre-calibrated to particular pressures. I presently prefer to use pre-calibrated bellows 18 in two pound increments and to provide such devices for tires that have a room temperature pressure (not having been driven for several hours) of 24 psi 26, psi 28, and psi 30. Various variables enter into these calibrations including the bellows, or equivalent spring of FIG. 4, the excursion of the temperature sensitive device the physical construction of the particular valve mechanism employed, etc. In this fashion any under inflation will be readily apparent because the red ball (or white colored ball) at 22 will be readily visible at the outer end of the tubular member shown in FIG. 3. The operator will then know that that particular tire needs more pressure and will also be informed that there is leakage of air if none of the other tires show lower than calibrated pressure. The relief valve aspect of the device makes it unnecessary for a person to carry a tire gauge to check the proper inflation of the tire during inflation inasmuch as the device will automatically relieve excess pressure. The automobile user accordingly is free to merely inspect the different tire stems to which this device is secured and if no balls 22 are visible the operator knows that all tires are at the proper pressure.

Various modifications and improvements will occur to those skilled in the art and I include within the scope of the following claims all such variations and modifications that fall within the true spirit and scope of my invention.

I claim:

1. A combined underinflation indicator and relief valve for tires comprising:
   (a) a tubular member having an inner end for attachment to a tire stem of a tire to expose it to tire pressure and having an outer end normally exposed to atmospheric pressure and having a longitudinal axis;
   (b) an apertured transverse partition inside the tubular member and exposed to tire pressure on one side and normally exposed to atmospheric pressure on the other side;
   (c) a valve positioned at the partitioned aperture for opening and closing the aperture in partition;
   (d) a reciprocating indicator means mounted in the outer end of the tubular member for reciprocation parallel to the longitudinal axis;
   (e) and a resilient device secured to the tubular member and engaging the valve and exposed to tire pressure and responsive to a preselected pressure to move to open the valve when the tire pressure exceeds the preselected pressure and to move to close the valve when the preselected pressure exists, and said resilient device being connected also to the reciprocating indicator means to move it toward the outer end of the tubular member when the tire pressure is below the preselected pressure;
   (f) and means for temperature compensating the resilient device to restrict its movement at high temperatures of the tire air, whereby temperature induced increases in tire pressure will not cause the valve to open.

* * * * *